(12) United States Patent
True et al.

(10) Patent No.: US 10,915,520 B2
(45) Date of Patent: Feb. 9, 2021

(54) VISUAL DATA SUMMARIES WITH COGNITIVE FEEDBACK

(71) Applicant: International Business Machines Corporation, Armonk, NY (US)

(72) Inventors: Joseph True, Hudson, MA (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/205,480

(22) Filed: Nov. 30, 2018

(65) Prior Publication Data

US 2020/0174996 A1 Jun. 4, 2020

(51) Int. Cl.
*G06F 16/23* (2019.01)
*G06F 11/34* (2006.01)
*G06F 11/30* (2006.01)
*G06F 16/25* (2019.01)

(52) U.S. Cl.
CPC ...... *G06F 16/2379* (2019.01); *G06F 11/3037* (2013.01); *G06F 11/3438* (2013.01); *G06F 16/252* (2019.01)

(58) Field of Classification Search
CPC .............. G06F 16/2379; G06F 16/252; G06F 11/3037; G06F 11/3438
USPC ........................................................ 707/722
See application file for complete search history.

(56) References Cited

U.S. PATENT DOCUMENTS

| | | |
|---|---|---|
| 4,845,653 A | 7/1989 | Conrad et al. |
| 6,384,847 B1 | 5/2002 | Rabenhorst |
| 6,867,788 B1 * | 3/2005 | Takeda ................. G06F 16/248 345/630 |
| 7,029,121 B2 | 4/2006 | Edwards |
| 8,825,649 B2 | 9/2014 | Heimendinger et al. |
| 9,298,589 B2 | 3/2016 | Gautallin et al. |
| 9,377,864 B2 | 6/2016 | Tullis et al. |
| 9,471,629 B2 | 10/2016 | Thope et al. |
| 9,633,110 B2 | 4/2017 | Mendelovich et al. |
| 2002/0109712 A1 * | 8/2002 | Yacovone ............... G06F 16/41 715/732 |

(Continued)

OTHER PUBLICATIONS

"Data Visualization," Wikipedia [Accessed Online Nov. 23, 2018], 13 pages. https://en.wikipedia.org/wiki/Data_visualization.

(Continued)

*Primary Examiner* — Hicham Skhoun
(74) *Attorney, Agent, or Firm* — Patterson + Sheridan, LLP (57) ABSTRACT

Embodiments disclosed herein generate visual summaries of data and improve the same using cognitive feedback. In one embodiment, a data visualization application determines properties associated with data or portion(s) thereof, and then generates and combines visualizations of the determined properties into visual data summaries. Examples of visualizations that may be generated include box plots, histograms, graphs, charts, and word clouds. Examples of visual summaries that combine such visualizations include videos, animated GIF (Graphics Interchanged Format) files, powerpoints, PDF (Portable Document Format) files, and web pages. Subsequent to generating visual summaries, the data visualization application may monitor user interactions with those visual summaries and update the same by rebuilding the visual summaries based on the user interactions.

20 Claims, 7 Drawing Sheets

(56) References Cited

U.S. PATENT DOCUMENTS

| | | | |
|---|---|---|---|
| 2013/0097177 A1* | 4/2013 | Fan | G06F 16/221 |
| | | | 707/748 |
| 2013/0124958 A1 | 5/2013 | Mendelovich et al. | |
| 2017/0024914 A1* | 1/2017 | Srivastava | G06F 3/0482 |
| 2017/0364958 A1* | 12/2017 | Kirti | G06Q 30/0275 |

OTHER PUBLICATIONS

"Data Mining," Wikipedia [Accessed Online Nov. 23, 2018] https://en.wikipedia.org/wiki/Data_discovery 15 pages.

"IBM Watson Analytics," https://www.ibm.com/us-en/marketplace/watson-analytics [Accessed Online Nov. 23, 2018] 8 pages.

"Business Intelligence and Analytics | Tableau Software," https://www.tableau.com/ [Accessed Online Nov. 23, 2018] 4 pages.

"Search-Driven Analytics for Humans | ThoughtSpot," http://www.thoughtspot.com/.

"Opening and Viewing Data," SAS(R) Studio 3.5: User's Guide, http://support.sas.com/documentation/cdl/en/webeditorug/68828/HTML/default/viewer.htmt#p1x00d1nlz4f7nn1haqszmqz8xqt.htm.

"3.1—Viewing the Contents of SAS Libraries," Stat 480, https://onlinecourses.science.psu.edu/stat480/node/24.

"Transforming visualized data through visual analytics based on interactivity,".

\* cited by examiner

VISUAL DATA SUMMARIES WITH COGNITIVE FEEDBACK

BACKGROUND

Field of the Invention

The present invention relates to data analysis and discovery, and more specifically, to generating visual data summaries with cognitive feedback.

Description of the Related Art

Large amounts of data are routinely generated and stored in the new age of "big data." Quickly accessing and understanding contents of a large database or data set can be challenging. Traditional tools for exploring data typically require a user to access the data with an appropriate software application and then apply Structured Query Language (SQL) statements or interactively explore the data. Such a manual data exploration process is time consuming, so users cannot quickly browse data. In addition, different types of structured and unstructured data may require different methods of exploration and analysis.

SUMMARY

According to one embodiment, a computer-implemented method is provided for generating and updating visual data summaries. The method generally includes determining properties associated with received data, and generating a plurality of visualizations based, at least in part, on the determined properties. The method further includes combining the generated visualizations into a visual summary using a summary function, and monitoring user interactions with the visual summary. In addition, the method includes updating the summary function based, at least in part, on the monitored user interactions, and rebuilding at least one portion of the visual summary using the updated summary function.

Further embodiments include a computer system configured to carry out the above method, and a non-transitory computer-readable storage medium comprising instructions that cause the computer system to carry out the above method.

DETAILED DESCRIPTION

Embodiments disclosed herein provide techniques for automatically generating visual summaries of data and improving the same using cognitive feedback. As used herein, a visual summary refers to an electronic format file or set of files, such as a video, an animated GIF (Graphics Interchanged Format) file, a powerpoint, a PDF (Portable Document Format) file, web page, etc. Embodiments use visual summaries to quickly convey key information about data, leveraging the visual nature of human beings. In one embodiment, a data visualization application determines properties associated with data or portion(s) thereof and creates visual summaries by generating and combining visualizations of the determined properties, such as box plots, histograms, graphs, charts, word clouds, etc. In such a case, the properties that are determined may include any quality, characteristic, or other relevant information associated with the data and/or portion(s) thereof, such as statistical properties (e.g., mean, median, minimum, maximum, mode, sum, etc.), data types (e.g., text, numerals, etc.), how the data is structured (e.g., as unstructured data, as tables in a database, etc.), metadata information (e.g., file name, file size, creation date, location, etc.), name information (e.g., table names, column names, header names, etc.), locations (e.g., geographical locations, addresses, etc.), and/or information extracted through text analytics or natural language processing (e.g., extracted entities, extracted topics, sentiment, etc.). Subsequent to generating visual summaries, the data visualization application may monitor user interactions with the visual summaries and update the same by rebuilding the visual summaries based on the user interactions.

Figure 1:
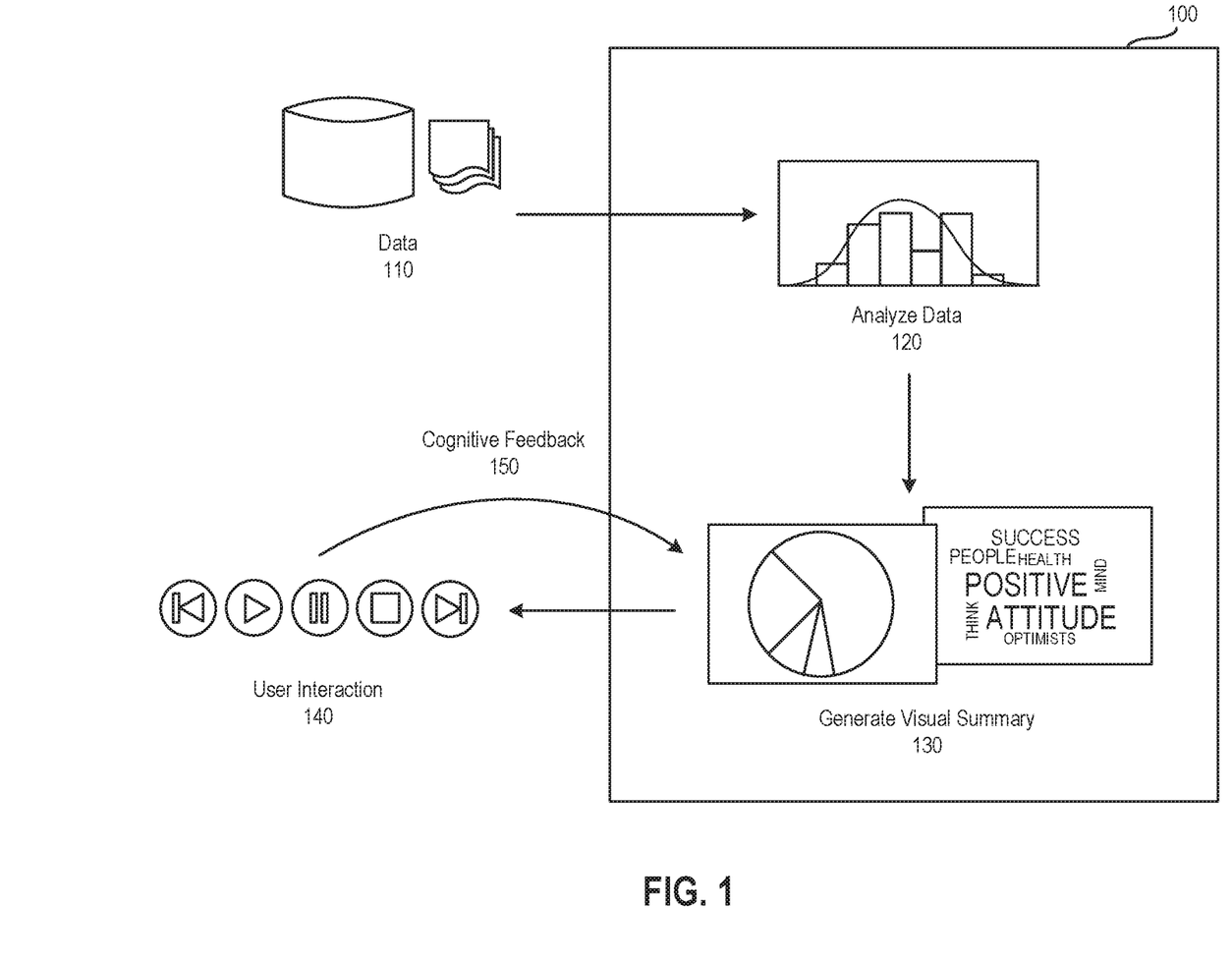
FIG. 1 illustrates an approach for creating visual data summaries and improving the same based on cognitive feedback, according to an embodiment.

FIG. 1 illustrates an approach for creating visual data summaries and improving the same based on cognitive feedback, according to an embodiment. As shown, a data visualization application 100 takes data 110 as input, analyzes the data 110 at 120, and generates a visual summary of the data 110 at 130 based on the data analysis. Although shown for exemplary purposes as a single software application, the data visualization application 100 may also be implemented as more than one application. The data 110 that the data visualization application 100 receives as input may include any structured and/or unstructured data. Structured data may include, e.g., table(s) in a database, a table in a data set file, a spreadsheet, etc. Unstructured data may include, e.g., text-based files, multimedia files, an individual file, etc. For example, the data 110 may include data stored in a data file from a collection of database or data set files in a data lake or computer file system environment.

The analys(es) performed by the data visualization application 100 on the data 110, as well as the visual summary of the data 110 that is generated based on such analys(es), will generally depend on the type of data being analyzed. In addition to analyzing and generating the visual summary of the data 110, the data visualization application 100 monitors the interactions of users with the visual summary at 140 and utilizes information collected through such monitoring as cognitive feedback 150 to rebuild the visual summary.

Figure 2:
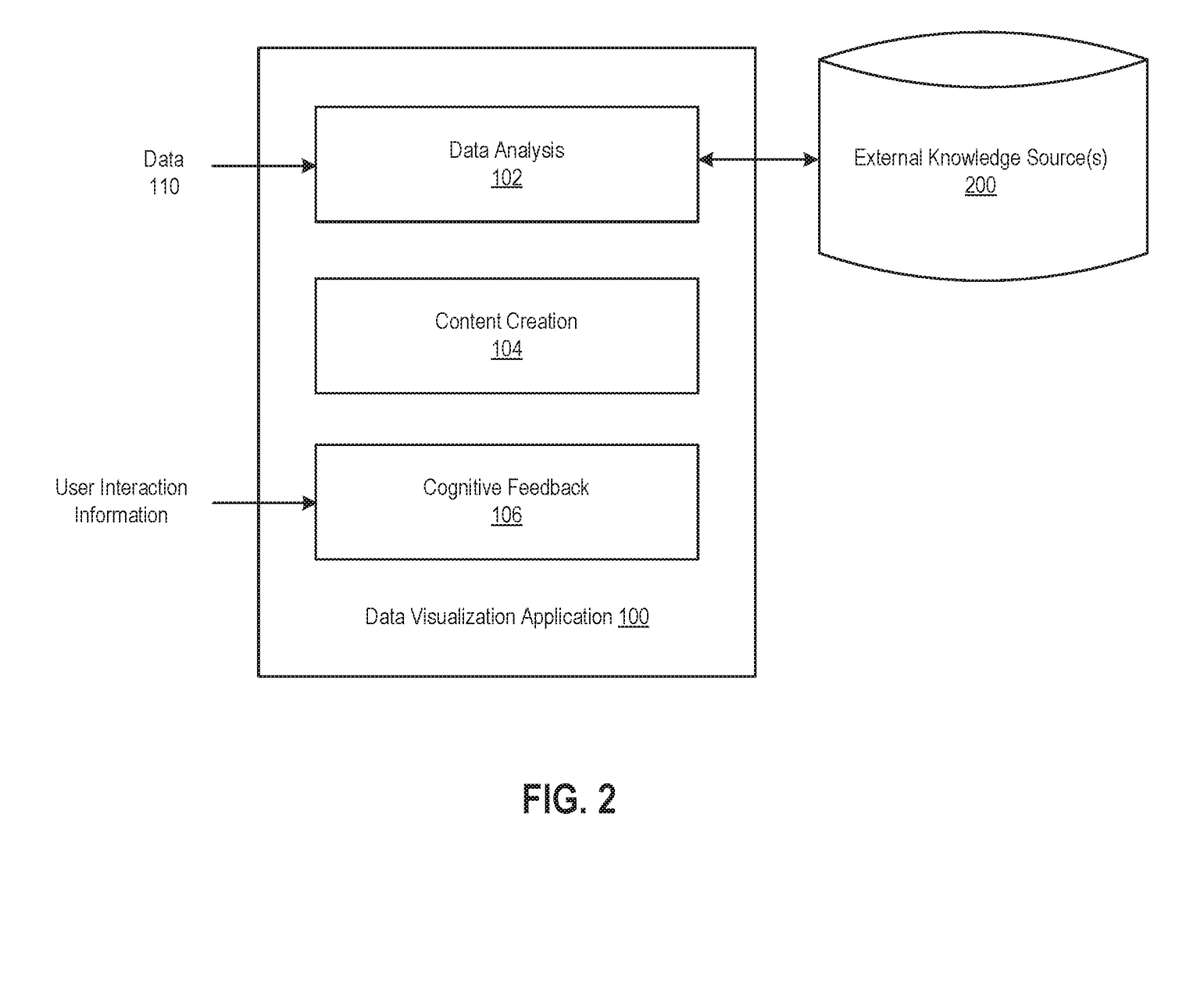
FIG. 2 illustrates a data visualization application in greater detail, according to an embodiment.

FIG. 2 illustrates the data visualization application 100 in greater detail, according to an embodiment. As shown, the data visualization application 100 includes a data analysis module 102, a content creation module 104, and a cognitive feedback module 106. Although shown for exemplary purposes as separate modules, the data analysis module 102, content creation module 104, and/or cognitive feedback module 106 may be combined in other embodiments. The data analysis module 102 is responsible for analyzing and summarizing the received data 110 using any suitable techniques, which may include utilizing content-specific knowledge and/or external knowledge to derive information from the data 110 that can then be presented in visual summaries.

In order to utilize content-specific knowledge, the data analysis module 102 may include logic that, e.g., (1) parses metadata associated with the data 110 to determine a file name, file size, creation data, location, etc.; (2) determines a number of columns and rows in table(s) of a database or data set file; (3) determines column names in table(s) of a database or data set file; (4) determines data types such as text, numbers, etc.; (5) performs text analytics and/or natural language processing if the data 110 includes text; (6) determines descriptive and statistical information such as a minimum, maximum, median, and mode of numbers in the data 110; (7) identifies dates in the data 110; and/or (8) determines geographical locations in the data 110. That is, the data analysis module 102 is configured to determine what information is included in the data 110, as well as to summarize and describe the data 110 based on those type(s) of information.

External knowledge may also be used by the data analysis module 102 to determine what information is included in, summarize, and describe the data 110. Illustratively, the data analysis module 102 is in communication with external knowledge source(s) 200, which may include one or more knowledge bases, ontologies, taxonomies, dictionaries, and/or glossaries that may provide definitions, properties, classifications, categorizations, relationships, and/or hierarchies, etc. in one or more domains. Each of the external knowledge source(s) 200 may be a public resource (e.g., a public ontology or taxonomy) or a private resource (e.g., a private business dictionary including terms and categories such as a company's products, an enterprise ontology, or an enterprise glossary). In one embodiment, the data analysis module 102 may match text, such as keywords, in the data 110 to information provided by the external knowledge source(s) 200, such as concepts, terms, and/or categories in public knowledge bases, ontologies, and taxonomies and/or private business dictionaries, enterprise ontologies, and enterprise glossaries. For example, if the data 110 includes a column that lists business or city names, the data analysis module 102 may match those business or city names to a category, such as "businesses" or "cities," based on a comparison of the listed business or city names to categories specified in the external knowledge source(s) 200. Such a classification of data is also sometimes referred to as topic extraction.

In addition to analyzing the data 110, the data visualization application 100 generates a visual summary of the data 110 based on the analys(es) performed. As described, the data visualization application 100 includes content creation module 104, which in one embodiment is responsible for using results of the analysis performed by the data analysis module 102 to create visualizations and combine those visualizations into visual summaries. As described, a visual summary is an electronic format file or set of files, such as a video, an animated GIF file, a powerpoint, a PDF file, web page, etc. Any suitable visualizations may be included in a visual summary, and the particular visualizations used may generally depend on the data being visualized. Text data may be visualized using, e.g., a word cloud, while numerical data may be visualized using, e.g., box plots, histograms, graphs, charts, etc. For example, if the data includes a continuous collection of numbers, the content creation module 104 may generate a visualization showing a distribution of the numbers, where those number fall within a range, or the like. As a specific example, if a table includes two columns, one storing the names of cars and another storing the fuel economy of those cars in miles per gallon (mpg), then the content creation module 104 may generate a visualization showing mean, minimum, and maximum mpg values as well as the names of cars that achieve such mpg values. In addition, the content creation module 104 may generate text-to-speech narration and add such narration to the visual summary. For example, the visual summary that is generated may be an electronic formatted video file such as an AVI (Audio Video Interleave) or MP4 (MPEG-4 Part 14) file that includes data visualizations in a particular order, transitions between the visualizations, and associated narration generated through text-to-speech narration.

Subsequent to generating the visual summary of the data 110, the data visualization application 100 monitors user interactions with the visual summary and updates the visual summary based on such user interactions. As described, the data visualization application 100 includes cognitive feedback module 106, which in one embodiment is responsible for recording user interactions with the visual summary and rebuilding the visual summary, as well as (optionally) other related visual summaries, based on the user interactions. Returning to the example of a video file, a user may access and interact with the video file by, e.g., hovering over the file to trigger playback; selecting the file and starting playback; clicking on the play, pause, fast forward, and reverse buttons; and/or clicking on a particular visualization for more details. In such a case, the cognitive feedback module 106 may learn from user interactions where users fast forwarded or scanned to in the video, how long they watched the video, whether they repeated the playback of certain portions of the video, what types of visualizations they viewed, whether they changed the volume of a narration up or down (or muted the volume), whether they paused at or drilled into any portion of the video, etc. In one embodiment, the cognitive feedback module 106 may then rebuild the video by quantifying the user interactions into weighted numerical values, updating a summary function used to generate visual summaries by plugging in the numeric values, and rebuilding the video using the updated summary function. In another embodiment, only portions of the visual summary that have statistically significant user interactions may be rebuilt. In addition to rebuilding a video (or other type of visual summary) based on monitored user interactions with the video (or other visual summary), the cognitive feedback module 106 may, in one embodiment, use monitored user interactions with visual summaries to rebuild other, related visual summaries.

Figure 3:
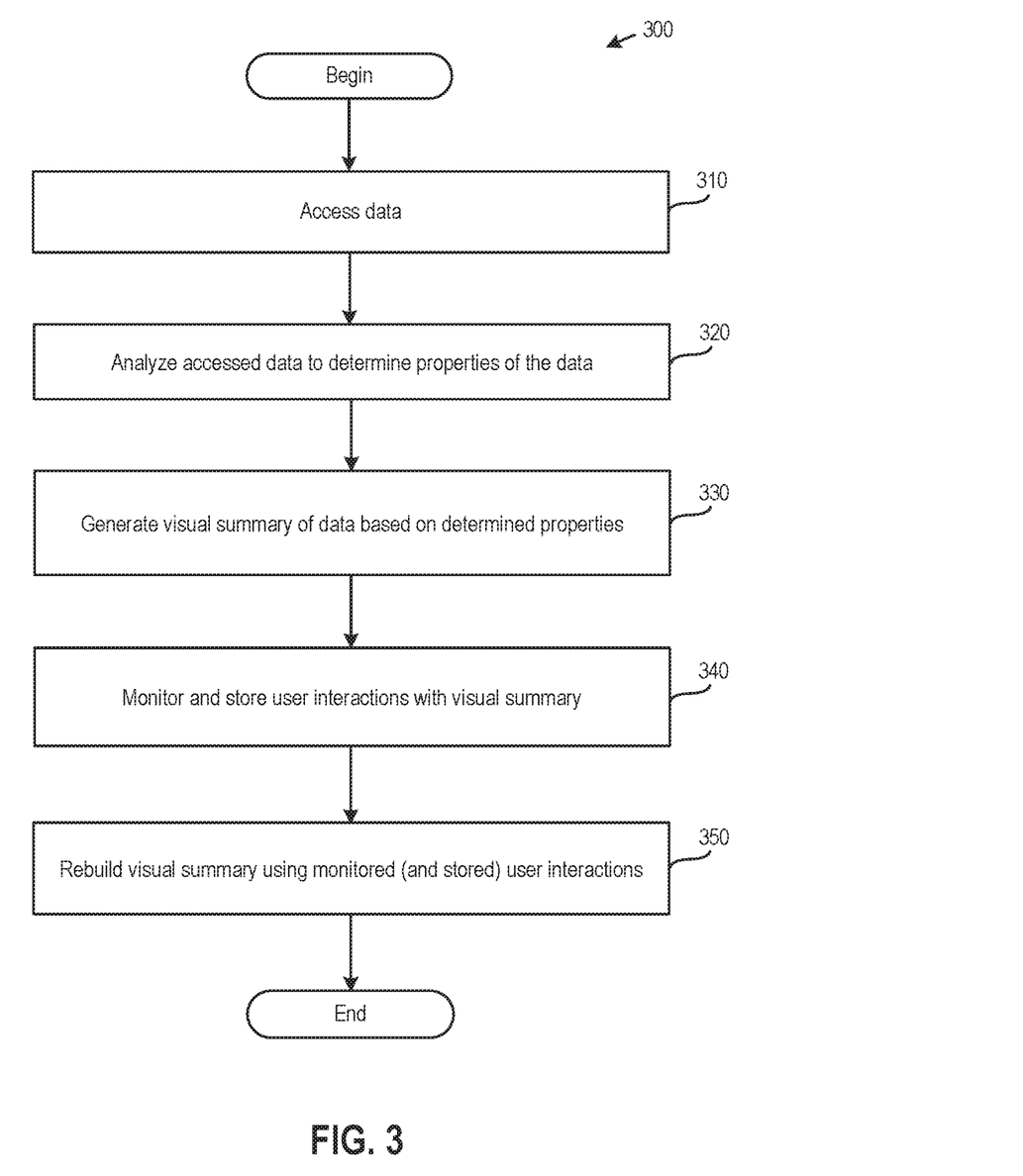
FIG. 3 illustrates a method for generating and updating visual data summaries, according to an embodiment.

FIG. 3 illustrates a method 300 for generating and updating visual data summaries, according to an embodiment. As shown, the method 300 begins at step 310, where the data analysis module 102 of the data visualization application 100 accesses data. The accessed data may generally include any structured and/or unstructured data. Accessing the data may include accessing a file, such as a database file containing tables, a spreadsheet file, a text-based file, a multimedia file, etc.

At step 320, the data analysis module 102 analyzes the accessed data to determine properties of the data. As described, the determined properties may include any quality, characteristic, or other relevant information associated with the data or portion(s) thereof, such as statistical properties, how the data is structured, metadata information, name information, locations, and/or information extracted through text analytics or natural language processing. Further, the data analysis module 102 may utilize any suitable numerical, text analytics, natural language processing, and/or other data analysis techniques, depending on what the data itself includes and what the visual summary of the data will include. In particular, the data analysis module 102 may employ content-specific knowledge and/or external sources of knowledge in analyzing the data.

Figure 4:
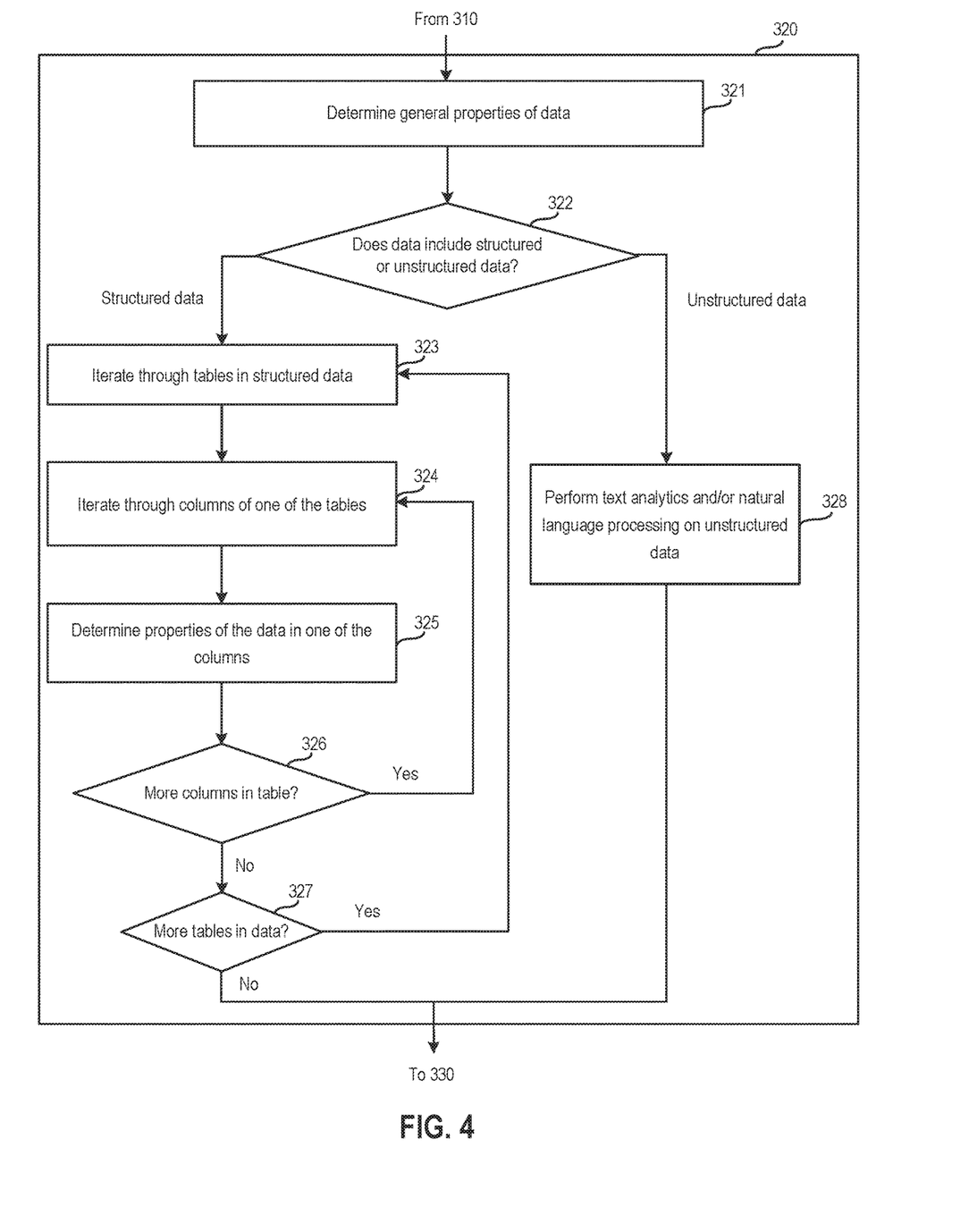
FIG. 4 illustrates one of the steps in the method of FIG. 3 in greater detail, according to an embodiment.

FIG. 4 illustrates the data analysis of step 320 in greater detail, according to an embodiment. As shown, at step 321, the data analysis module 102 determines general properties of the data, i.e., properties that are not specific to data in any particular table, column, or other data set within the data. In one embodiment, the data analysis module 102 may extract such general properties from metadata associated with a file that stores the data. For example, the data analysis module 102 may extract from the metadata information such as a file name, file size, creation date, location, etc. If the data includes tables in a database, then in one embodiment the data analysis module 102 may determine general properties such as a number of tables in the database, a number of columns and rows in each of the tables, etc.

At step 322, the data analysis module 102 determines whether the data includes structured or unstructured data. Although shown for convenience as a separate step, it should be understood that whether the data includes structured or unstructured data may also be one of the general data properties determined at step 321. In one embodiment, the data analysis module 102 may distinguish between structured and unstructured data by looking at a file extension of the file storing the data and/or examining contents of the data itself. For example, the data analysis module 102 may understand that a .doc file includes text that is unstructured data, a .db file includes structured data in the form of database tables, etc.

If the data is determined to include structured data, then at step 323, the data analysis module 102 iterates through tables in the structured data. Although tables are used as a reference example, other structured data such as spreadsheets may be processed in a similar manner as tables (e.g., column by column). Within a table being processed, the data analysis module 102 iterates through columns of the table at step 324. At step 325, the data analysis module 102 determines properties of data in one of the columns of the table. In one embodiment, the data analysis module 102 may determine properties relating to what the data in the column generally includes, and then perform particular analysis techniques based on what the data includes to determine further properties. For example, the data analysis module 102 may first determine properties such as the data type (e.g., text or numerals) of data in the column, the name of the column, and/or an extracted topic. Topic extraction in particular may be used to classify data in a column that does not have a name, such as to identify that a column including particular names of businesses or cities is a column of business or city names. As described, such topic extraction may include, e.g., matching the data in a column to information in public and/or private external knowledge sources such as ontologies, taxonomies, etc. Further, the data analysis module 102 may include hard-coded and/or fuzzy logic. For example, fuzzy logic may be implemented that can guess the column name "1st nm" refers to last name.

Subsequent to determining what data in the column includes, the data analysis module 102 further performs relevant analysis based on what the data includes. In one embodiment, content-specific knowledge and/or external knowledge may be used to derive information from the data in the column. For example, the data analysis module 102 may determine statistical properties of numerical data, such as the mean, median, minimum, maximum, mode, sum, count, etc. of numerical data or dates. As another example, the data analysis module 102 may employ text analytics, also sometimes referred to as text mining, and/or natural language processing techniques to determine properties of text data. Text analytics and natural language processing techniques are known for extracting entities, determining sentiment, and clustering content, among other things. To analyze text data, the data analysis module 102 may also utilize one or more public and/or private knowledge bases, ontologies, taxonomies, dictionaries, and/or glossaries that provide definitions, properties, classifications, categorizations, relationships, and/or hierarchies, etc. in one or more domains. Similar to the discussion above with respect to topic extraction, the data analysis module 102 may match text data in the column to information provided by such external knowledge source(s).

At step 326, if the data analysis module 102 determines that there are more columns in the table to process, then the method 300 returns to step 324, where the data analysis module 102 continues to iterate through columns of the table and determine properties of data in the columns. On the other hand, if there no more columns in the table to process, then the method 300 continues to step 327, where the data analysis module 102 determines whether there are more tables in the data to process, in which case the method 300 returns to step 323, where the data analysis module 102 continues to iterate through the tables in the data and processes another table.

Returning to FIG. 3, at step 330, the content creation module 104 of the data visualization application 100 generates a visual summary of the data based on the properties determined at step 320. In one embodiment, the content creation module 104 generates the visual summary by combining visualizations of the determined properties of the data into a single visual summary. As described, the visual summary is an electronic format file or set of files, such as a video, animated GIF, powerpoint, PDF file, web page, etc. The visualizations that are combined to create a visual summary may include any suitable graphic depictions of data properties, such as images, videos, and/or other types of files. For example, the content creation module 104 may generate visualizations that include (1) an image showing that a particular data file includes a table with ten columns and fifty rows, as well as metadata information such as the file name and size, and (2) images including graphs or charts that depict properties of data in one or more of the columns of the table, as determined by the data analysis module 102. The content creation module 104 may further combine such images into a single visual summary, such as a video file displaying each of the images for a number of frames and including transitions between the images. In one embodiment, the content creation module 104 may also incorporate audio narration, such as a text-to-speech narration of text that appears in the visualizations, into the visual summary.

Figure 5:
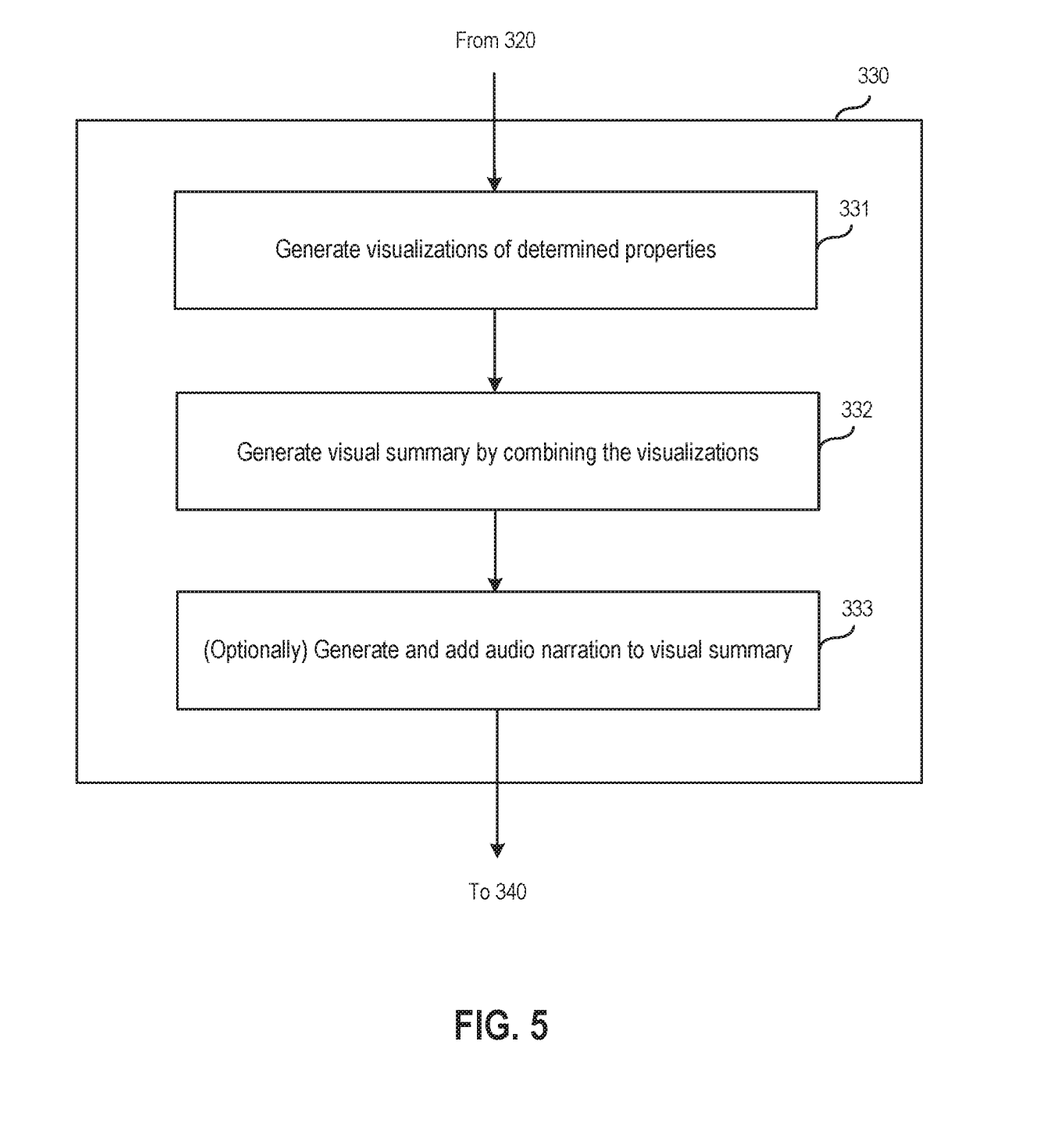
FIG. 5 illustrates another of the steps in the method of FIG. 3 in greater detail, according to an embodiment.

FIG. 5 illustrates generating the visual summary at step 330 in greater detail, according to an embodiment. As shown, at step 331, the content creation module 104 generates visualizations of the properties determined by the data analysis module 102 at step 320. In one embodiment, the content creation module 104 may include logic that selects suitable types of visualizations based on the properties that are determined, and then uses values of those properties to generate the actual visualizations. Each visualization may be stored in any suitable file format, such as an image file. For example, the content creation module 104 may generate a word cloud visualization showing the relative importance or frequency of words in text data, which may be properties determined via the data analysis at step 320. As another example, statistical properties of numerical data, as determined by the data analysis module 102 at step 320, may be visualized using box plots, histograms, pie charts, graphs, etc. As yet another example, the content creation module 104 may generate a visualization that includes a table or list of properties of the data, such as file metadata information, a number of tables the data includes, numbers of columns in the tables, etc.

At step 332, the content creation module 104 generates a visual summary by combining the visualizations generated at step 331. Combining the visualizations may include determining a sequence for the visualizations and assembling the visualizations into a visual summary (e.g., a video, animated GIF, powerpoint, PDF file, web page, etc.) in the determined sequence. In one embodiment, the content creation module 104 may use a summary function to determine the visualizations to include in the visual summarization and/or the sequence of such visualizations. That is, not all of the visualizations generated at step 331 need to be included in the visual summary, and the content creation module 104 may include logic to select particular visualizations to include (or to not create certain visualizations in the first place), as well as to determine an order for the selected visualizations. The content creation module 104 may also combine multiple visualizations into a single visualization in some cases. For example, multiple graphs generated to depict various data properties may be combined into a single visualization that is added as a frame to a video.

In one embodiment, the content creation module 104 may generate different visual summaries for different groups of users. For example, the content creation module 104 may generate one visual summary for domain experts and another visual summary for all other users. In another embodiment, the content creation module 104 may account for aspects of the data itself, such as a domain or industry of the data, which may be determined based on, e.g., associated metadata and/or data values in the data. For example, the content creation module 104 may include logic that generates different types of visual summaries for different domains or industries.

At step 333, the content creation module 104 (optionally) generates and adds an audio narration to the visual summary. In one embodiment, the content creation module 104 may use text-to-speech techniques to convert some (or all) text in the visualizations in the visual summary into an audio narration that the content creation module 104 then adds to the visual summary. For example, the content creation module 104 may generate a video as the visual summary and add to the video an audio narration that is generated using text-to-speech techniques and describes visualizations in the video or portions thereof. In such a case, the narration may describe, e.g., minimum and maximum values of data shown in the visualizations, a name and size of a file that stores the data, etc.

Returning to FIG. 3, at step 340, the cognitive feedback module 106 monitors and stores user interactions with the visual summary. A user may interact with the visual summary over the Internet, on a local computing device, or in any other suitable manner. Examples of user interactions that the cognitive feedback module 106 may monitor include hovering over the visual summary file to trigger playback; selecting the visual summary file and starting playback; clicking on the play, pause, fast forward, and reverse buttons if the visual summary is a video; and/or clicking on a particular visualization in the visual summary for more details (i.e., clicking or drilling through).

At step 350, the cognitive feedback module 106 rebuilds the visual summary generated at step 330 using the monitored (and stored) user interactions. That is, the cognitive feedback module 106 learns how to build a better visual summary, and then rebuilds the previously generated visual summary, based on the monitored user interactions. In one embodiment, the entire visual summary may be rebuilt from scratch. In an alternative embodiment, only portions of the visual summary may be rebuilt, such as the portions associated with statistically significant user interactions (e.g., portions where users spent the most time viewing the visual summary). In some embodiments, machine learning techniques may be employed to learn from the monitored user interactions and improve the visual summary.

Figure 6:
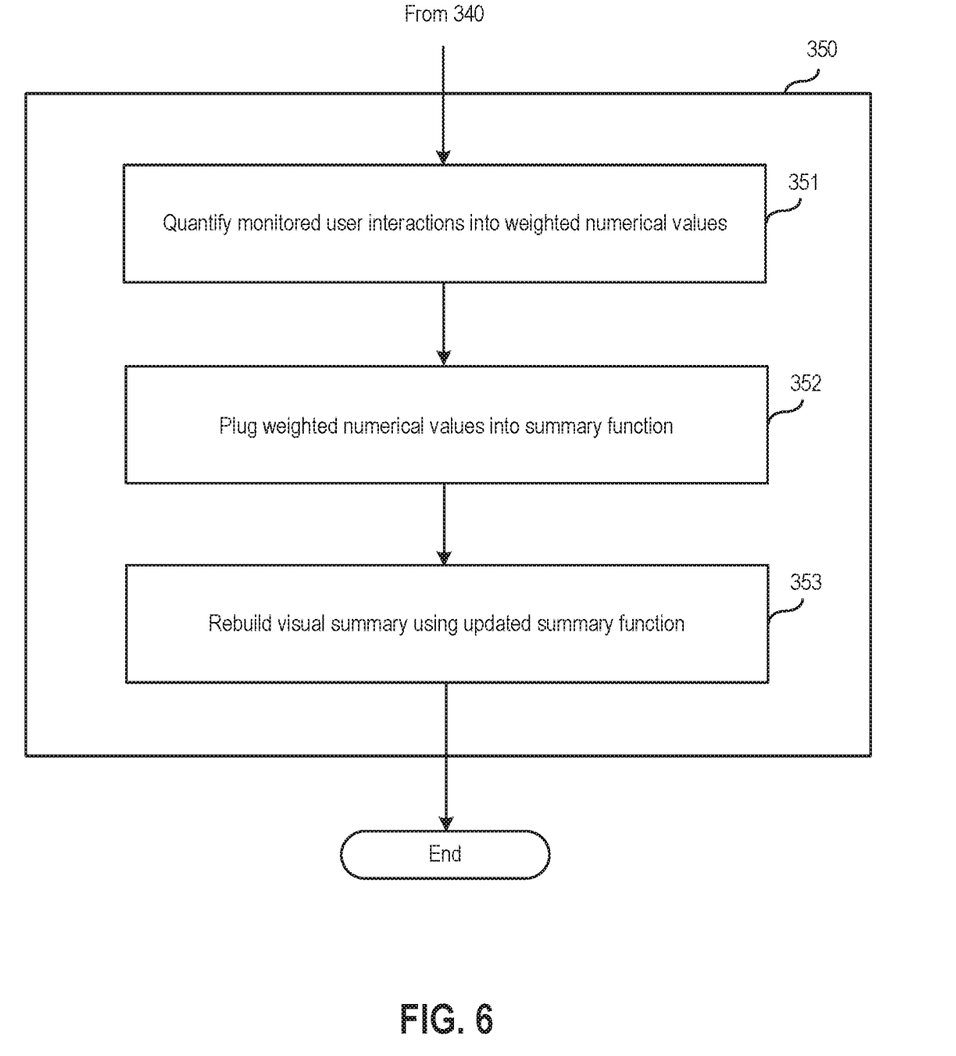
FIG. 6 illustrates another of the steps in the method of FIG. 3 in greater detail, according to an embodiment.

FIG. 6 illustrates rebuilding the visual summary at step 350 in greater detail, according to an embodiment. As shown, at step 351, the cognitive feedback module 106 quantifies the monitored (and stored) user interactions into weighted numerical values. In one embodiment, the weighted numerical values are numeric multipliers for particular visualizations in the visual summary. In such a case, the weighted numerical values may be determined based on, e.g., how long users watched the visual summary or portions thereof, which visualizations users fast forwarded or scanned to in the visual summary, which visualizations users clicked or drilled through for more details, and/or other user interactions indicative of user interest in particular visualizations within the visual summary. Further, some user interactions may be weighted more than others based on, e.g., the importance of those interactions. For example, fast forwarding and stopping at a particular visualization in a video may be weighted more heavily than playing the video to the same visualization without stopping.

In one embodiment, the cognitive feedback module 106 may group the monitored (and stored) user interactions into classes, normalize the user interactions in each of those classes, and rebuild the visual summary using the normalized user interactions. That is, the user interactions may be profiled based on a data classification over the visual summary content and a profile of the users themselves. For example, the cognitive feedback module 106 may group together interactions with the visual summary by users who are domain experts. As another example, the cognitive feedback module 106 may group together interactions by users of a certain age group, such as young users who may be inexperienced. This assumes that certain information about the users, such as the users' experience or age, is known. The cognitive feedback module 106 may also predict such information based on the user's interactions if certain interactions are indicative of subject understanding or an age group of the users. After grouping user interactions into classes, the cognitive feedback module 106 may give the interactions by certain user classes, such as domain experts whose interactions might be highly indicative of a need to revise the visual summary, more weight than the interactions by other user classes, such as young users whose interactions may not be indicative of a need to revise the visual summary. In another embodiment, the cognitive feedback module 106 may rebuild visual summaries differently for different groups of users. In yet another embodiment, the cognitive feedback module 106 may account for aspects of the data itself in rebuilding visual summaries, such as a domain or industry of the data determined based on, e.g., metadata associated with the data and/or data values in the data.

At step 352, the cognitive feedback module 106 plugs the weighted numerical values into a summary function. As described, the summary function may be used by the cognitive feedback module 106 to determine the visualizations and/or a sequence of such visualizations to add to a visual summary. By updating the summary function using the weighted numerical values that are determined based on monitored user interactions, the cognitive feedback module 106 effectively changes the way visual summaries are generated from visualizations of data. For example, the updated summary function may cause particular visualizations and/or portions of the visual summary that are weighted more heavily based on monitored user interactions to be placed more prominently in a rebuilt version of the visual summary, such as at the beginning of the rebuilt version of the visual summary.

At step 353, the cognitive feedback module 106 rebuilds the visual summary using the updated summary function. This step may be performed in conjunction with the content creation module 102 if, e.g., the cognitive feedback module 106 is configured to instruct the content creation module 102 to generate a new visual summary using the updated summary function. As described, the entire visual summary may be rebuilt or, alternatively, portions of the visual summary associated with statistically significant user interactions may be rebuilt. In addition to rebuilding the visual summary itself, the cognitive feedback module 106 in one embodiment may utilize monitored user interactions with visual summaries to rebuild other, related visual summaries. For example, the cognitive feedback module 106 may rebuild all of the visual summaries generated for data files (e.g., spreadsheets, text files, etc.) that are located in the same folder together. As another example, if particular types of visualizations (e.g., word clouds, pie charts, etc.) are preferred by users, then the cognitive feedback module 106 may learn such a preference across visual summaries and rebuild multiple visual summaries based on the learned preference.

Figure 7:
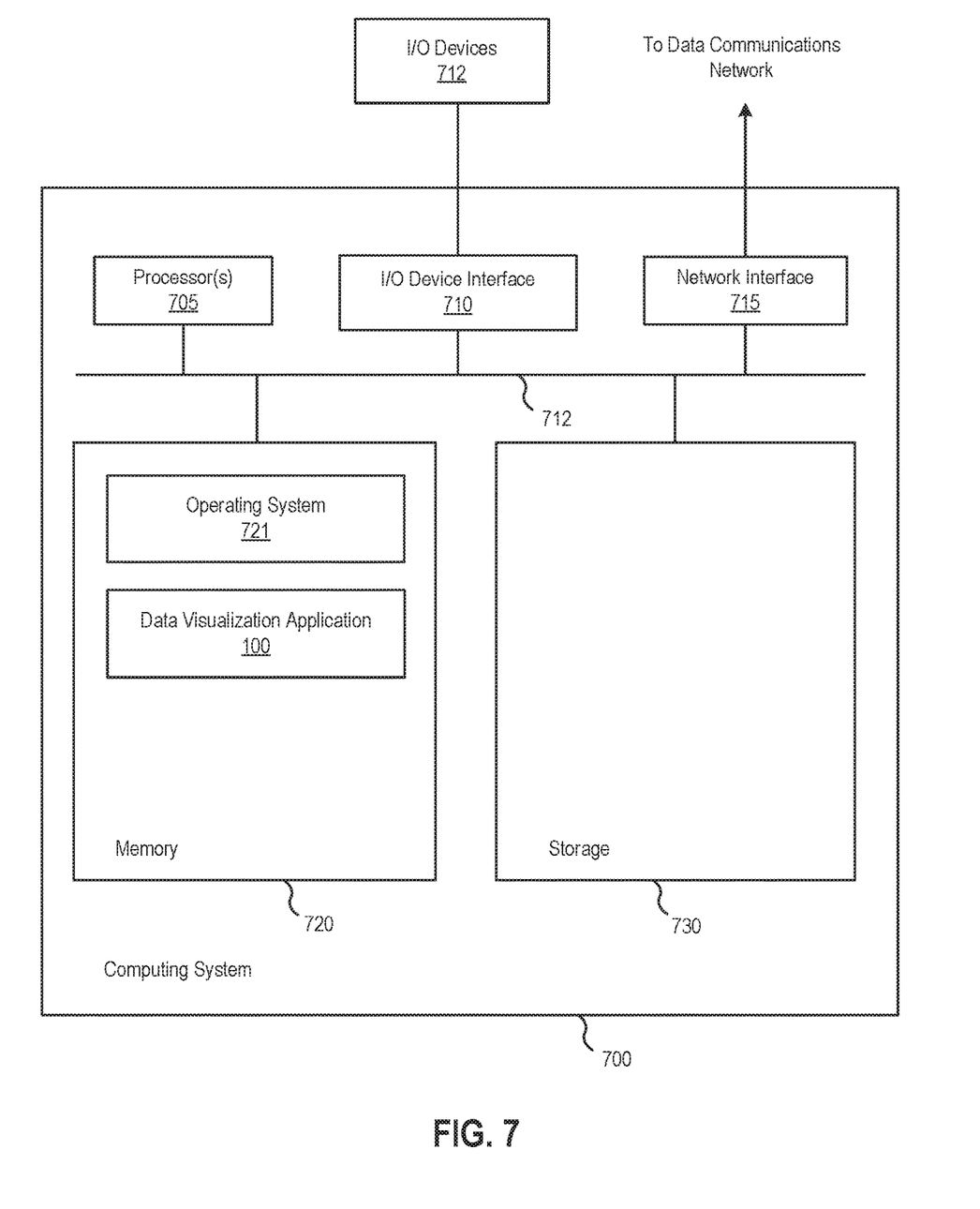
FIG. 7 illustrates a system in which an aspect of this disclosure may be implemented.

FIG. 7 illustrates a system 700 in which an aspect of this disclosure may be implemented. As shown, the system 700 includes, without limitation, a central processing unit (CPU) 705, a network interface 715 connecting the system 700 to a network 716, an interconnect 717, a memory 720, and storage 730. The system 700 also includes an I/O device interface 710 connecting I/O devices 712 (e.g., keyboard, display and mouse devices) to the system 700.

The CPU 705 retrieves and executes programming instructions stored in the memory 720. Similarly, the CPU 705 stores and retrieves application data residing in the memory 720. The interconnect 717 facilitates transmission, such as of programming instructions and application data, between the CPU 705, I/O device interface 710, storage 730, network interface 715, and memory 720. The CPU 705 is included to be representative of a single CPU, multiple CPUs, a single CPU having multiple processing cores, one or more graphics processing units (GPUs), a combination of such processors, and the like. And the memory 720 is generally included to be representative of a random access memory. The storage 730 may be a disk drive storage device. Although shown as a single unit, the storage 730 may be a combination of fixed and/or removable storage devices, such as magnetic disk drives, flash drives, removable memory cards or optical storage, network attached storage (NAS), or a storage area-network (SAN). Further, the system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 7 may be distributed across multiple computing systems connected by a data communications network.

As shown, the memory 720 includes an operating system 721 and the data visualization application 100. The operating system 721 may be, e.g., Linux® or Windows®. The data visualization application 100 is configured to generate visual summaries of data. In one embodiment, the data visualization application 100 may access data, analyze the accessed data to determine properties of the data, generate a visual summary based on the determined properties, monitor and store user interactions with the visual summary, and rebuild the visual summary using the monitored (and stored) user interactions, according to the method 300 described above with respect to FIGS. 3-6.

Advantageously, techniques disclosed herein generate visual summaries of data that allow users to quickly and visually see key data content. Doing so may improve user interactions with large amounts of data and reduce the time required to find and understand data. In particular, users may engage in "smart browsing" of data by viewing the visual summaries as a pre-process to exploring the data itself. Visual summaries may also be generated for different types of structured and unstructured data, and users who view such visual summaries are not required to utilize different methods of exploration and analysis for the different types of data. In addition, techniques disclosed herein employ cognitive feedback to improve visual summaries that have been generated based on user interactions with such visual summaries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the foregoing features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a data visualization application) or related data available in the cloud. For example, the data visualization application could execute on a computing system in the cloud and generate visual summaries of data and improve the same using cognitive feedback, as well as store the visual summaries at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for generating and updating visual data summaries, the computer-implemented method comprising:
    determining data properties associated with received data;
    generating a plurality of visualizations based, at least in part, on the determined data properties;
    combining the generated visualizations into a visual summary using a summary function;
    monitoring user interactions with the visual summary;
    determining user properties associated with the user interactions;
    grouping the monitored user interactions into a plurality of classes, based on the determined data properties and user properties;
    normalizing the grouped user interactions across the plurality of classes and by operation of one or more computer processors;
    updating the summary function based, at least in part, on the normalized user interactions; and
    rebuilding at least one portion of the visual summary using the updated summary function.

2. The computer-implemented method of claim 1, wherein the determining of the data properties includes:
    determining whether the received data includes structured or unstructured data;
    responsive to determining the received data includes unstructured data, applying at least one of a text analytics or natural language processing technique to the received data; and
    responsive to determining the received data includes structured data in one or more tables, iteratively applying, to data in each of the one or more tables and each column therein, at least one numerical or text analytics technique.

3. The computer-implemented method of claim 1, wherein the determined data properties include at least one of statistical properties, data types, metadata information, temporal information, location information, name information, data structure information, and information extracted using at least one of a text analytics or a natural language processing technique.

4. The computer-implemented method of claim 1, wherein the determining of the data properties includes matching text in the received data to information provided in at least one of a public knowledge base, public ontology, public taxonomy, private business dictionary, enterprise ontology, or enterprise glossary.

5. The computer-implemented method of claim 1, wherein:
    the updating of the summary function includes:
        quantifying the monitored user interactions into weighted values, and
        updating the summary function based, at least in part, on the weighted values; and
    the rebuilding of the at least one portion of the visual summary includes combining one or more of the generated visualizations into a rebuilt version of the at least one portion of the visual summary using the updated summary function.

6. The computer-implemented method of claim 1, wherein the at least one portion of the visual summary that is rebuilt includes one or more portions of the visual summary associated with monitored user interactions that exceed a predefined threshold for statistical significance.

7. The computer-implemented method of claim 1, wherein the monitored user interactions include at least one of fast forwarding or jumping to temporal locations in the visual summary, replaying portions of the visual summary, drilling or clicking through portions of the visual summary, or changing the volume of an audio narration for the visual summary.

8. A non-transitory computer-readable storage medium storing a program executable to perform an operation for generating and updating visual data summaries, the operation comprising:
    determining data properties associated with received data;
    generating a plurality of visualizations based, at least in part, on the determined data properties;
    combining the generated visualizations into a visual summary using a summary function;
    monitoring user interactions with the visual summary;
    determining user properties associated with the user interactions;
    grouping the monitored user interactions into a plurality of classes, based on the determined data properties and user properties;
    normalizing the grouped user interactions across the plurality of classes and by operation of one or more computer processors when executing the program;
    updating the summary function based, at least in part, on the normalized user interactions; and
    rebuilding at least one portion of the visual summary using the updated summary function.

9. The non-transitory computer-readable medium of claim 8, wherein the determining of the data properties includes:
    determining whether the received data includes structured or unstructured data;
    responsive to determining the received data includes unstructured data, applying at least one of a text analytics or natural language processing technique to the received data; and
    responsive to determining the received data includes structured data in one or more tables, iteratively applying, to data in each of the one or more tables and each column therein, at least one numerical or text analytics technique.

10. The non-transitory computer-readable medium of claim 8, wherein the determined data properties include at least one of statistical properties, data types, metadata information, temporal information, location information, name information, data structure information, and information extracted using at least one of a text analytics or a natural language processing technique.

11. The non-transitory computer-readable medium of claim 8, wherein the determining of the data properties includes matching text in the received data to information provided in at least one of a public knowledge base, public ontology, public taxonomy, private business dictionary, enterprise ontology, or enterprise glossary.

12. The non-transitory computer-readable medium of claim 8, wherein:
the updating of the summary function includes:
quantifying the monitored user interactions into weighted values, and
updating the summary function based, at least in part, on the weighted values; and
the rebuilding of the at least one portion of the visual summary includes combining one or more of the generated visualizations into a rebuilt version of the at least one portion of the visual summary using the updated summary function.

13. The non-transitory computer-readable medium of claim 8, wherein the at least one portion of the visual summary that is rebuilt includes one or more portions of the visual summary associated with monitored user interactions that exceed a predefined threshold for statistical significance.

14. The non-transitory computer-readable medium of claim 8, wherein the monitored user interactions include at least one of fast forwarding or jumping to temporal locations in the visual summary, replaying portions of the visual summary, drilling or clicking through, or changing a volume.

15. A system for generating and updating visual data summaries, the system comprising:
one or more computer processors; and
a memory including a program executable by the one or more computer processors to perform an operation comprising:
determining data properties associated with received data;
generating a plurality of visualizations based, at least in part, on the determined data properties;
combining the generated visualizations into a visual summary using a summary function;
monitoring user interactions with the visual summary;
determining user properties associated with the user interactions;
grouping the monitored user interactions into a plurality of classes, based on the determined data properties and user properties;
normalizing the grouped user interactions across the plurality of classes;
updating the summary function based, at least in part, on the monitored user interactions; and
rebuilding at least one portion of the visual summary using the updated summary function.

16. The system of claim 15, wherein the determining of the data properties includes:
determining whether each of a plurality of portions of the received data includes structured or unstructured data;
upon determining that a first portion of the received data includes unstructured data, applying a natural language processing technique to the first portion of the received data; and
upon determining that a second portion of the received data includes structured data in one or more tables, iteratively applying, to data in each of the one or more tables and each column therein, at least one numerical analytics technique or text analytics technique.

17. The system of claim 16, wherein the determined data properties include statistical properties, data types, metadata information, temporal information, location information, name information, data structure information, and information extracted using the natural language processing technique;
wherein the determining of the data properties includes matching text in the received data to information provided in at least one of a public knowledge base, a public ontology, a public taxonomy, a private business dictionary, an enterprise ontology, and an enterprise glossary.

18. The system of claim 17, wherein the updating of the summary function includes quantifying the monitored user interactions into weighted values and updating the summary function based at least in part on the weighted values;
wherein the rebuilding of the at least one portion of the visual summary includes combining one or more of the generated visualizations into a rebuilt version of the at least one portion of the visual summary using the updated summary function;
wherein the at least one portion of the visual summary that is rebuilt includes one or more portions of the visual summary associated with monitored user interactions that exceed a predefined threshold for statistical significance.

19. The system of claim 18, wherein the visual summary is a video or an animated GIF (Graphics Interchanged Format) file, wherein the operation further comprises:
generating an audio narration based, at least in part, on the determined data properties; and
adding the audio narration to the visual summary.

20. The system of claim 19, wherein the monitored user interactions include fast forwarding or jumping to temporal locations in the visual summary, replaying portions of the visual summary, drilling or clicking through portions of the visual summary, and changing the volume of the audio narration.

* * * * *